United States Patent
Johnsen

(10) Patent No.: US 9,623,587 B2
(45) Date of Patent: Apr. 18, 2017

(54) WALL SAW WITH SAFETY CLUTCH

(71) Applicant: Anders Johnsen, Borlange (SE)

(72) Inventor: Anders Johnsen, Borlange (SE)

(73) Assignee: TRACTIVE AB, Borlange (SE)

( * ) Notice: Subject to any disclaimer, the term of this patent is extended or adjusted under 35 U.S.C. 154(b) by 16 days.

(21) Appl. No.: 14/784,025

(22) PCT Filed: Apr. 12, 2013

(86) PCT No.: PCT/SE2013/050404
§ 371 (c)(1),
(2) Date: Oct. 12, 2015

(87) PCT Pub. No.: WO2014/168533
PCT Pub. Date: Oct. 16, 2014

(65) Prior Publication Data
US 2016/0067887 A1 Mar. 10, 2016

(51) Int. Cl.
*B28D 1/04* (2006.01)
*B23D 47/12* (2006.01)
*F16D 7/02* (2006.01)

(52) U.S. Cl.
CPC ............ *B28D 1/045* (2013.01); *B23D 47/12* (2013.01); *B28D 1/044* (2013.01); *F16D 7/027* (2013.01)

(58) Field of Classification Search
CPC .......... B28D 1/045; B28D 1/044; B28D 1/04; B23D 47/12; F16D 7/02
USPC ................... 125/13.01, 14, 12; 451/354, 439
See application file for complete search history.

(56) References Cited

U.S. PATENT DOCUMENTS

| 2,427,153 | A | | 9/1947 | Mossberg | |
|---|---|---|---|---|---|
| 2,952,146 | A | * | 9/1960 | Bruck | B23D 47/12 192/107 M |
| 3,722,497 | A | | 3/1973 | Hiestand et al. | |
| 6,295,910 | B1 | * | 10/2001 | Childs | B23D 47/12 192/150 |
| 8,789,521 | B2 | * | 7/2014 | Jonsson | B23D 47/12 125/13.01 |
| 2006/0000464 | A1 | | 1/2006 | Marques et al. | |
| 2006/0201492 | A1 | * | 9/2006 | Baratta | B23D 47/02 125/21 |
| 2007/0163412 | A1 | | 7/2007 | Baratta et al. | |

(Continued)

FOREIGN PATENT DOCUMENTS

| FR | 2265487 A2 | 10/1975 |
|---|---|---|
| WO | WO2009108094 A1 | 9/2009 |
| WO | WO2011028154 A1 | 3/2011 |

*Primary Examiner* — Robert Rose
(74) *Attorney, Agent, or Firm* — Schwabe Williamson & Wyatt, P.C.

(57) ABSTRACT

A wall saw comprising:—a carriage (2);—a saw arm (11) pivotally mounted to the carriage;—a rotatable spindle (10) rotatably mounted to the saw arm and configured for connection to a saw blade; and—an electric drive motor (13) for rotating the spindle. The rotor (36) of the drive motor comprises a rotor hub (66) which is operatively connected to the output shaft (14) of the drive motor through a safety clutch (67) so as to allow torque to be transmitted from the rotor hub to the output shaft via the safety clutch, the safety clutch being configured to allow mutual rotation between the rotor hub (66) and the output shaft (14) when said torque reaches a given threshold value. The safety clutch (67) is accommodated in a space inside the rotor hub (66).

15 Claims, 10 Drawing Sheets

(56) References Cited

U.S. PATENT DOCUMENTS

2009/0183722 A1* 7/2009 Marques ............... B23D 47/12
125/13.01
2012/0234305 A1 9/2012 Joensson

* cited by examiner

WALL SAW WITH SAFETY CLUTCH

CROSS REFERENCE TO RELATED APPLICATIONS

The present application is a national phase entry under 35 U.S.C. §371 of International Patent Application No. PCT/SE2013/050404, entitled "WALL SAW WITH SAFETY CLUTCH," filed Apr. 12, 2013. The entire content of International Patent Application No. PCT/SE2013/050404 is hereby incorporated by reference in its entirety.

FIELD OF THE INVENTION AND PRIOR ART

The present invention relates to a wall saw according to the preamble of claim 1.

A wall saw is a sawing machine primarily used for cutting walls, ceilings or floors made of concrete or similar materials. A conventional wall saw comprises a carriage which is moveable along a guide rail by means of a feeding device. A saw blade is mounted to a spindle, which is rotatably mounted to a saw arm. The saw arm is in its turn pivotally mounted to the carriage. The spindle is rotated by means of a drive motor, which is mounted to the carriage and operatively connected to the spindle through a transmission mechanism accommodated in the saw arm. When the saw arm is pivoted, the saw blade is moved upwards or downwards for adjustment of the depth of the cut. The saw arm may be pivoted by means of a motor or a manually operated actuating device mounted to the carriage.

Wall saws of the above-mentioned type are for instance disclosed in WO 2009/108094 A1, U.S. Pat. No. 3,722,497 A and US 2007/0163412 A1.

The above-mentioned transmission mechanism may comprise a set of gear wheels acting between the output shaft of the drive motor and the saw blade spindle, wherein driving torque for the rotation of the saw blade spindle is transmitted from the output shaft of the drive motor to the spindle via these gear wheels. In some situations, the rapidly rotating saw blade may be subjected to a sudden and unexpected stop, which will cause high stresses on the gear wheels of the transmission mechanism and on other parts of the wall saw. These high stresses may result in damages to the wall saw. In order to protect the wall saw from being subjected to such detrimental high stresses, it has been suggested in WO 2009/108094 A1 to include a friction safety clutch in the transmission mechanism between the output shaft of the drive motor and the saw blade spindle.

OBJECT OF THE INVENTION

The object of the present invention is to provide a wall saw having a new and favourable design.

SUMMARY OF THE INVENTION

According to the invention, said object is achieved by a wall saw having the features defined in claim 1.

The wall saw according to the invention comprises:
- a carriage, which is to be mounted to a guide rail so as to be moveable along the guide rail;
- a saw arm pivotally mounted to the carriage;
- a rotatable spindle configured for connection to a saw blade, the spindle being rotatably mounted to the saw arm;
- an electric drive motor, which is mounted to the carriage and which is provided with a stator, a rotor and an output shaft; and
- a transmission mechanism for transmitting torque from the output shaft of the drive motor to the spindle, the spindle being rotatable under the effect of the drive motor via the output shaft and the transmission mechanism.

The rotor of the drive motor comprises a rotor hub which is operatively connected to the output shaft of the drive motor through a safety clutch so as to allow torque to be transmitted from the rotor hub to the output shaft via the safety clutch, the safety clutch being configured to allow mutual rotation between the rotor hub and the output shaft when said torque reaches a given threshold value.

According to the invention, the safety clutch is accommodated in a space inside the rotor hub. The safety clutch is hereby incorporated in the wall saw in a space-saving manner without affecting the weight and complexity of the transmission mechanism and the saw arm.

According to an embodiment of the invention, the output shaft is provided with a torque tool fitting designed for detachable engagement with a torque tool to be used for rotating the output shaft in order to check said threshold value of the safety clutch. Hereby, the threshold value of the safety clutch can be checked in a simple and reliable manner.

According to another embodiment of the invention, the torque tool fitting is accessible through an opening provided in an external wall of a housing of the saw arm. Hereby, the torque tool fitting is easily and quickly accessible from the outside of the wall saw when there is a need to check the threshold value of the safety clutch.

Further advantages as well as advantageous features of the wall saw according to the invention will appear from the following description and the dependent claims.

BRIEF DESCRIPTION OF THE DRAWINGS

With reference to the appended drawings, a specific description of preferred embodiments of the invention cited as examples follows below. In the drawings.

DETAILED DESCRIPTION OF EMBODIMENTS OF THE INVENTION

Figure 1:
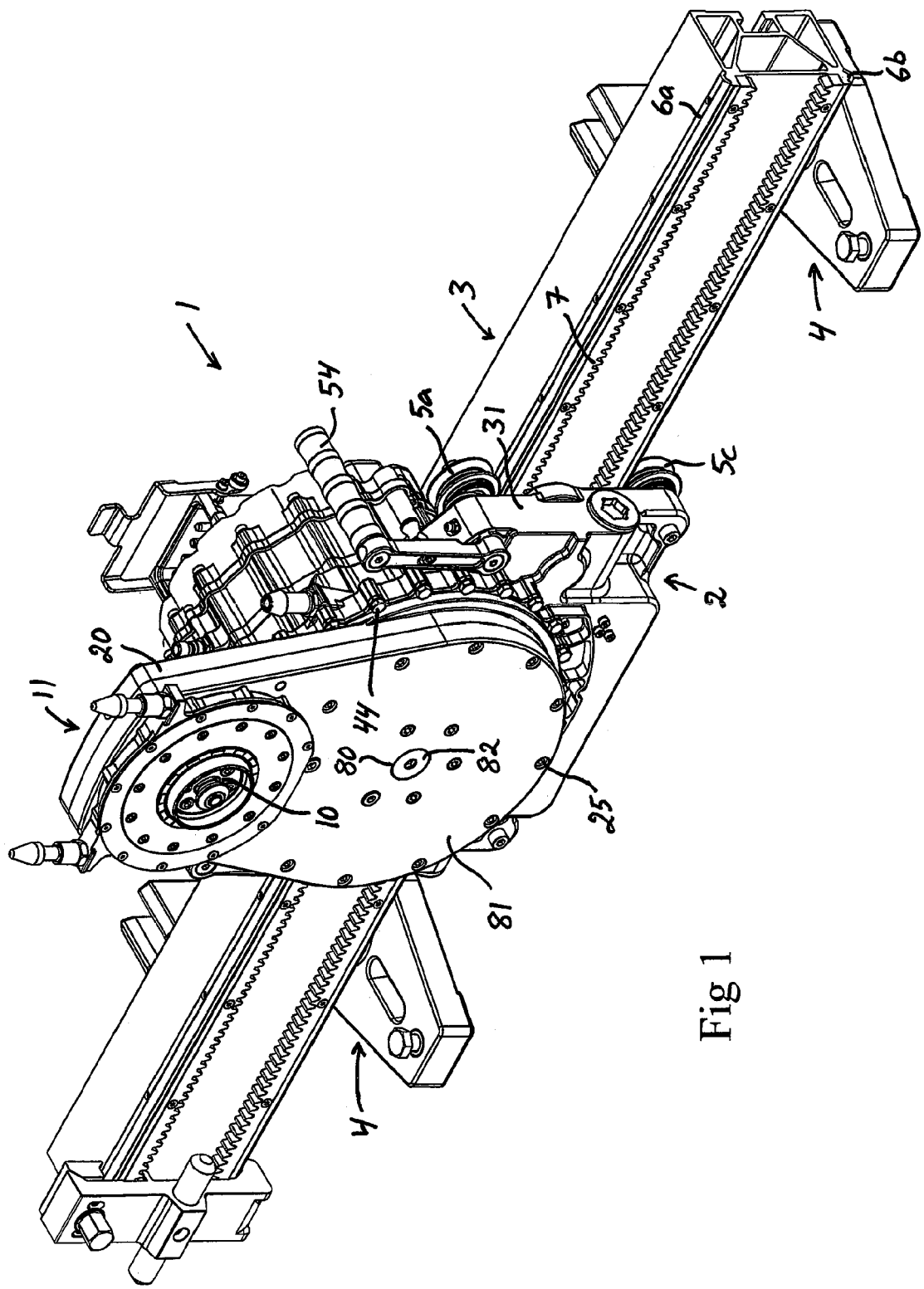
FIG. 1 is a perspective view of a wall saw according to an embodiment of the present invention.
Figure 2:
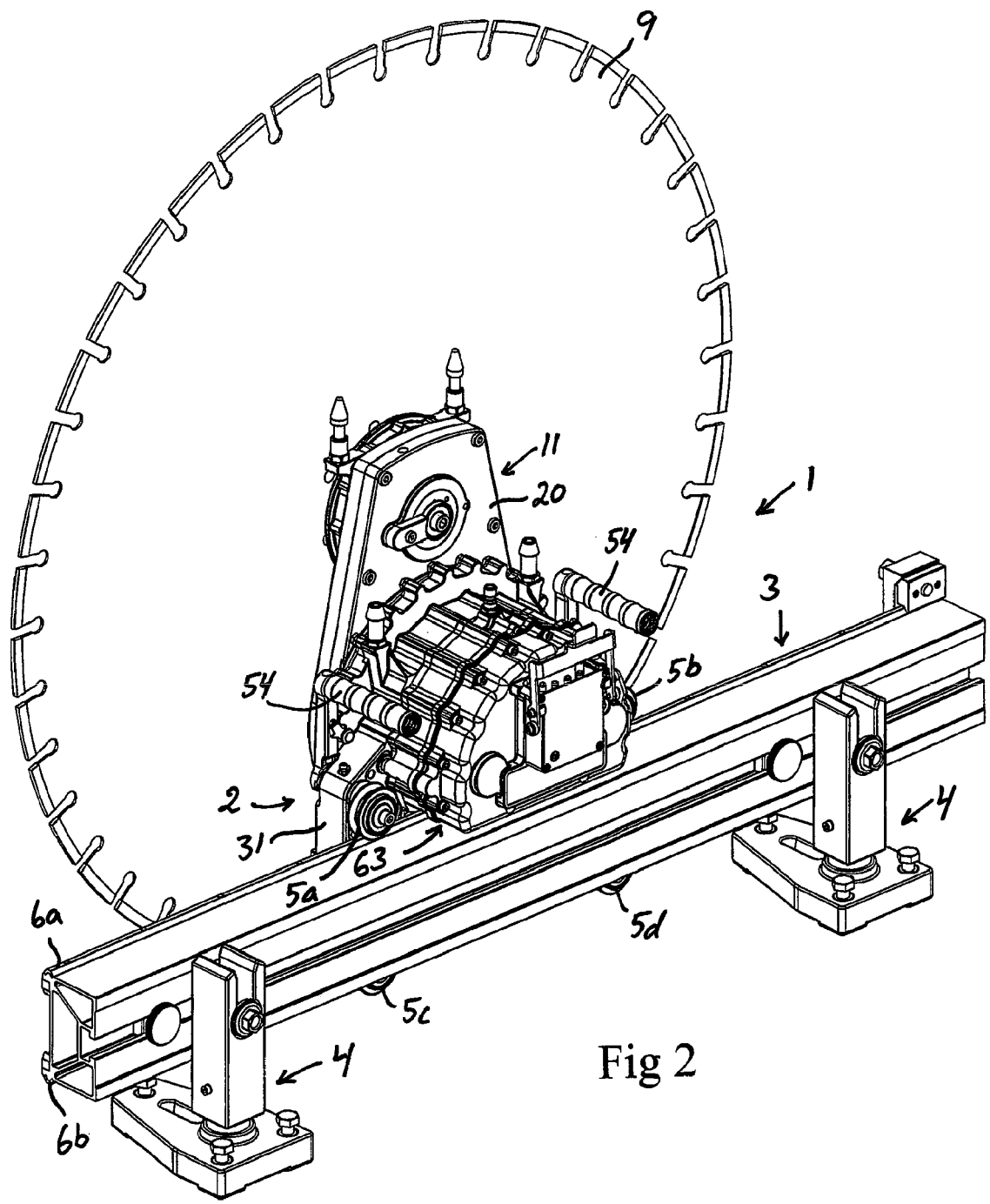
FIG. 2 is a perspective view of the wall saw of FIG. 1, as seen from another direction and with a saw blade mounted to the wall saw.

A wall saw 1 according to an embodiment of the present invention is illustrated in FIGS. 1 and 2. This wall saw 1 is primarily intended to be used for cutting walls, ceilings or floors made of concrete or similar materials. The wall saw 1 comprises a carriage 2, which is to be mounted to an elongated guide rail 3 so as to be moveable along the guide rail. The guide rail 3 is mounted to a floor or other supporting surface by means of support members 4, which are secured to the guide rail 3.

Guide rollers 5a-5d are rotatably mounted to the carriage 2. These guide rollers 5a-5d are in engagement with guide tracks 6a, 6b on the guide rail 3 and are arranged to keep the carriage 2 in place on the guide rail 3, while allowing the carriage 2 to move along the guide rail 3 in the longitudinal direction thereof. In the illustrated embodiment, the guide rail 3 is provided with an upper guide track 6a and a lower guide track 6b, which extend in parallel with each other along the guide rail. In the illustrated embodiment, two guide rollers 5a, 5b are in engagement with the upper guide track 6a from above and two other guide rollers 5c, 5d are in engagement with the lower guide track 6b from below.

Figure 3:
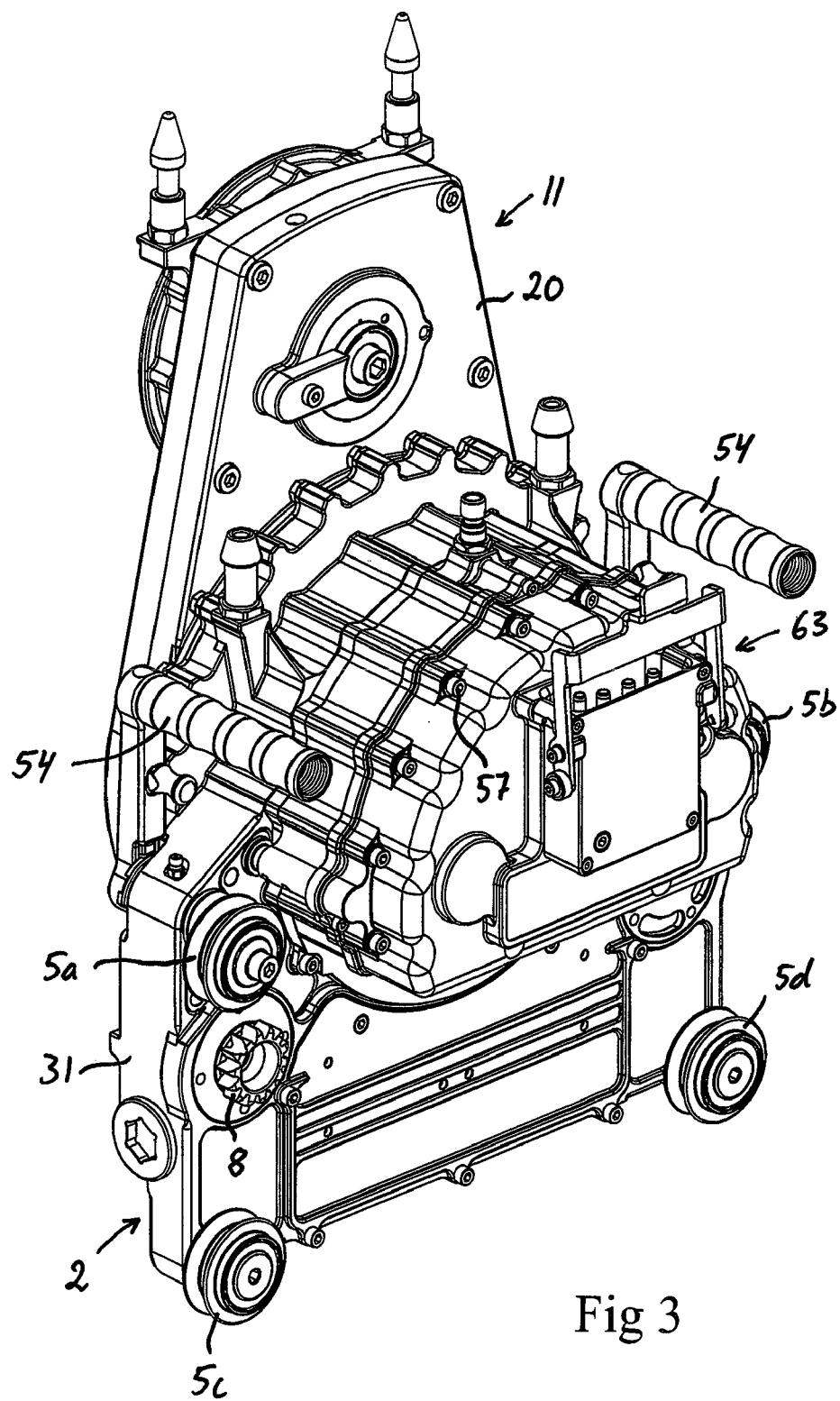
FIG. 3 is a perspective view of a carriage and a saw arm included in the wall saw of FIG. 1.

A cog track 7 is fixed to the guide rail 3 and extends in the longitudinal direction thereof in parallel with the guide tracks 6a, 6b. The carriage 2 is moveable along the cog track 7 by means of a feeding device, which comprises a feed gear wheel 8 (see FIG. 3) rotatably mounted to the carriage 2. The feed gear wheel 8 is in engagement with the cog track 7. The feeding device also comprises a feed motor (not shown) mounted to the carriage 2, by means of which the feed gear wheel 8 is rotatable in order to move the carriage 2 along the guide rail 3. The feed motor is preferably an electric motor, but could alternatively be a hydraulic motor.

Figure 7:
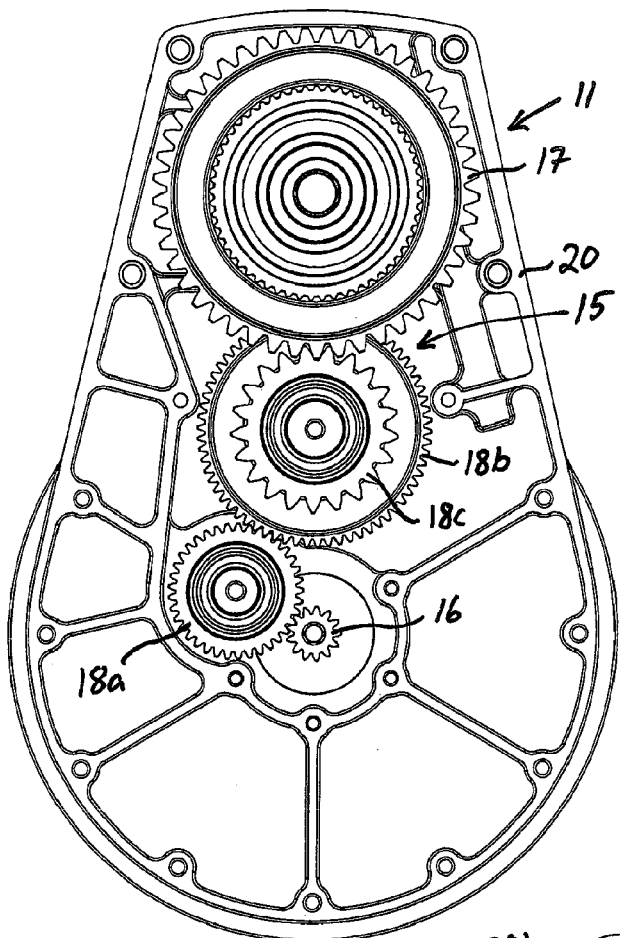
FIG. 7 is a sectioned front view of the saw arm included in the wall saw of FIG. 1.

A circular saw blade 9 (see FIG. 2) is to be attached to a rotatable spindle 10. In FIG. 1, the wall saw is shown without any saw blade attached to the spindle 10. The saw blade 9 is detachably attachable to the spindle 10 by means of a suitable coupling. The spindle 10 is rotatably mounted to a saw arm 11 by means of suitable bearings 12 (see FIG. 4) and is rotatable about a first axis of rotation A1. The spindle 10 is driven in rotation by means of an electric drive motor 13, which is mounted to the carriage 2. Driving torque is transmitted from an output shaft 14 of the drive motor 13 to the spindle 10 through a transmission mechanism 15 (see FIGS. 4 and 7). Thus, the spindle 10 is rotatable under the effect of the drive motor 13 via the output shaft 14 and the transmission mechanism 15. The transmission mechanism 15 comprises a set of gear wheels acting between the output shaft 14 of the drive motor and the spindle 10. One gear wheel 16 of the transmission mechanism 15 is non-rotatably fixed to the output shaft 14 of the drive motor 13 and another gear wheel 17 of the transmission mechanism 15 is non-rotatably fixed to the spindle 10. These gear wheels 16, 17 are operatively connected to each other via a number of intermediate gear wheels 18a, 18b, 18c rotatably mounted in an external housing 20 of the saw arm 11. In the illustrated example, two of said intermediate gear wheels 18b, 18c are non-rotatably connected to each other. As an alternative to gear wheels, the transmission mechanism 15 could be provided with a driving chain or driving belt for transmitting driving torque from the output shaft 14 of the drive motor to the spindle 10.

Figure 8:
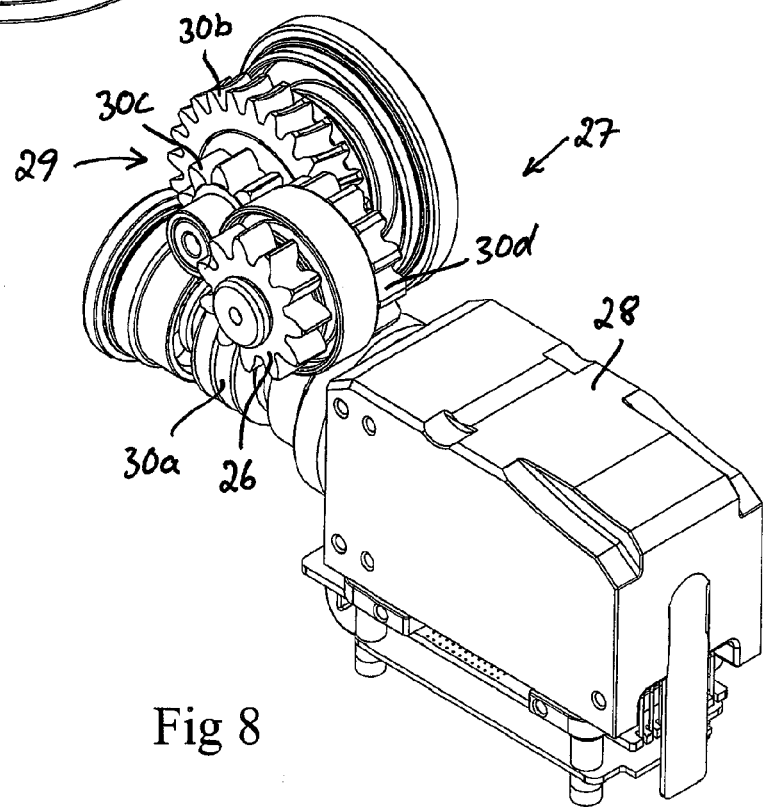
FIG. 8 is a perspective view of an actuating device included in the wall saw of FIG. 1.

The output shaft 14 of the drive motor 13 is rotatable about a second axis of rotation A2, which extends in parallel with and at a distance from said first axis of rotation A1. The saw arm 11 is pivotally mounted to the carriage 2 by means of suitable bearings 21, 22, 23 and is pivotable about a pivot axis A3, which is perpendicular to the longitudinal axis of the guide rail 3 and coincides with said second axis of rotation A2. The saw arm 11 is adjustable into different rotational positions in relation to the carriage 2 by being pivoted about the pivot axis A3. In the illustrated embodiment, a ring gear 24 (see FIGS. 4 and 6) is non-rotatably fixed to the saw arm housing 20 by means of fastening members 25 in the form of screws. A gear wheel 26 (see FIG. 8) is rotatably mounted to the carriage 2 and in engagement with the ring gear 24. The wall saw 1 comprises an actuating device 27 (see FIG. 8), by means of which said gear wheel 26 is rotatable in order to rotate the ring gear 24 and thereby pivot the saw arm 11 in relation to the carriage 2 about the pivot axis A3. The actuating device 27 comprises a motor 28 mounted to the carriage 2, by means of which said gear wheel 26 is rotatable. Said motor 28 is preferably an electric motor, but could alternatively be a hydraulic motor. The actuating device 27 also comprises a transmission mechanism 29 for transmitting torque from the output shaft of said motor 28 to said gear wheel 26. In the illustrated example, this transmission mechanism 29 comprises a worm screw 30a non-rotatably connected to the output shaft of the motor 28 and a number of intermediate gear wheels 30b, 30c, 30d acting between the worm screw 30a and said gear wheel 26. The gear wheel 26 is non-rotatably connected to the last one 30d of said intermediate gear wheels.

Figure 9:
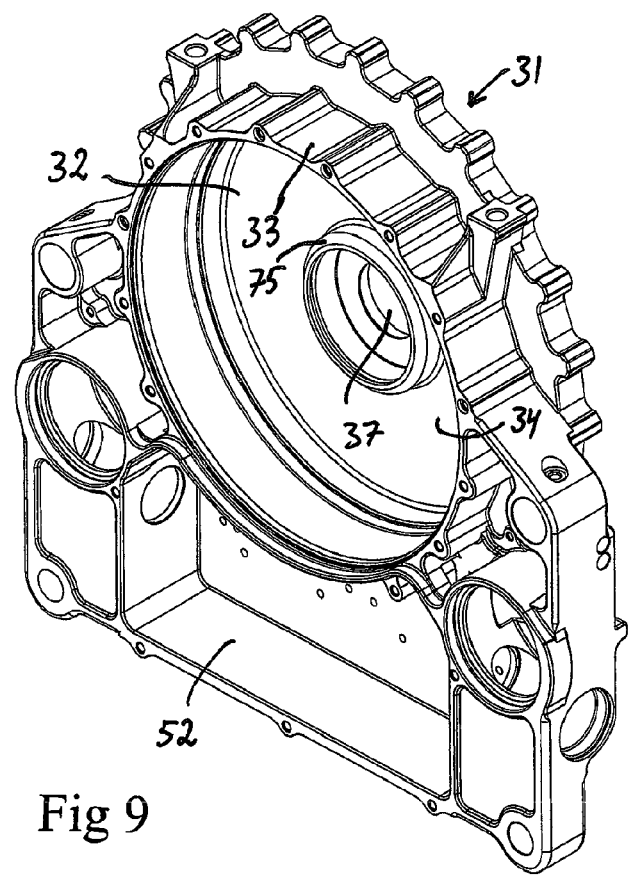
FIG. 9 is a perspective view of a chassis included in the carriage of the wall saw of FIG. 1.
Figure 10:
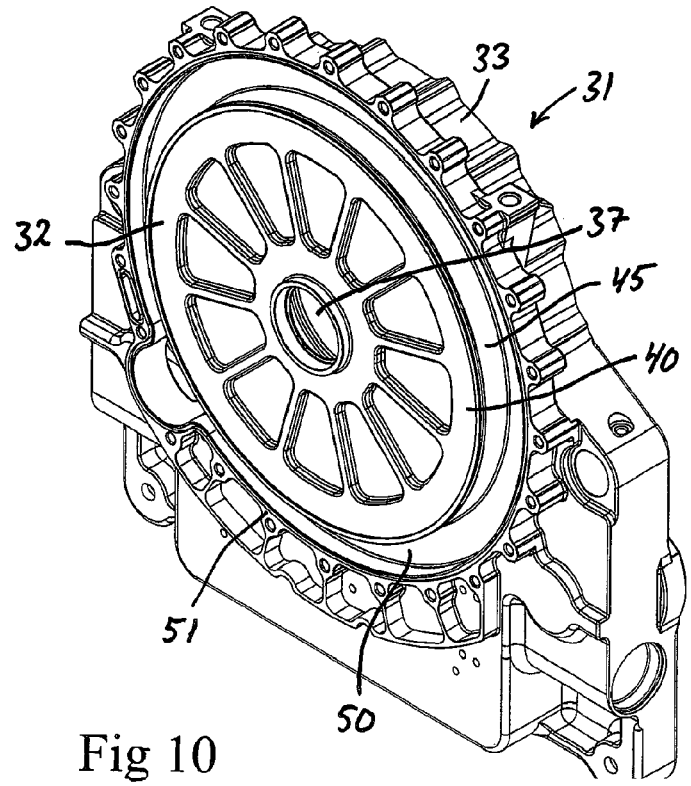
FIG. 10 is a perspective view of the chassis of FIG. 9, as seen from another direction.

In the illustrated embodiment, the drive motor 13 and the saw arm 11 are carried by a chassis 31 included in the carriage 2. The chassis 31 is vertically oriented and is preferably of metallic material, such as for instance steel. The chassis 31 comprises a vertical wall 32 (see FIGS. 4, 9 and 10) and a flange 33 protruding in a horizontal direction from this wall 32. This vertical wall 32 and the flange 33 are preferably formed in one piece, but are alternatively formed as separate pieces which are rigidly joined to each other by welding. The saw arm 11 is pivotally mounted to the chassis 31 on a first side of said wall 32 and a motor cavity 34 is provided in the chassis 31 on an opposite second side of said wall 32. In the following, said first side of the wall 32 is denominated the outer side of the wall, whereas said second side of the wall 32 is denominated the inner side of the wall. The motor cavity 34 is delimited in one axial direction by said wall 32 and in the radial direction by said flange 33, which forms a cylindrical inner wall of the motor cavity 34. The stator 35 and rotor 36 of the drive motor 13 are accommodated in the motor cavity 34. Thus, the stator 35 and rotor 36 of the drive motor 13 are protected by said wall 32 and flange 33 of the chassis 31. The output shaft 14 of the drive motor extends through an opening 37 in the wall 32.

Figure 4:
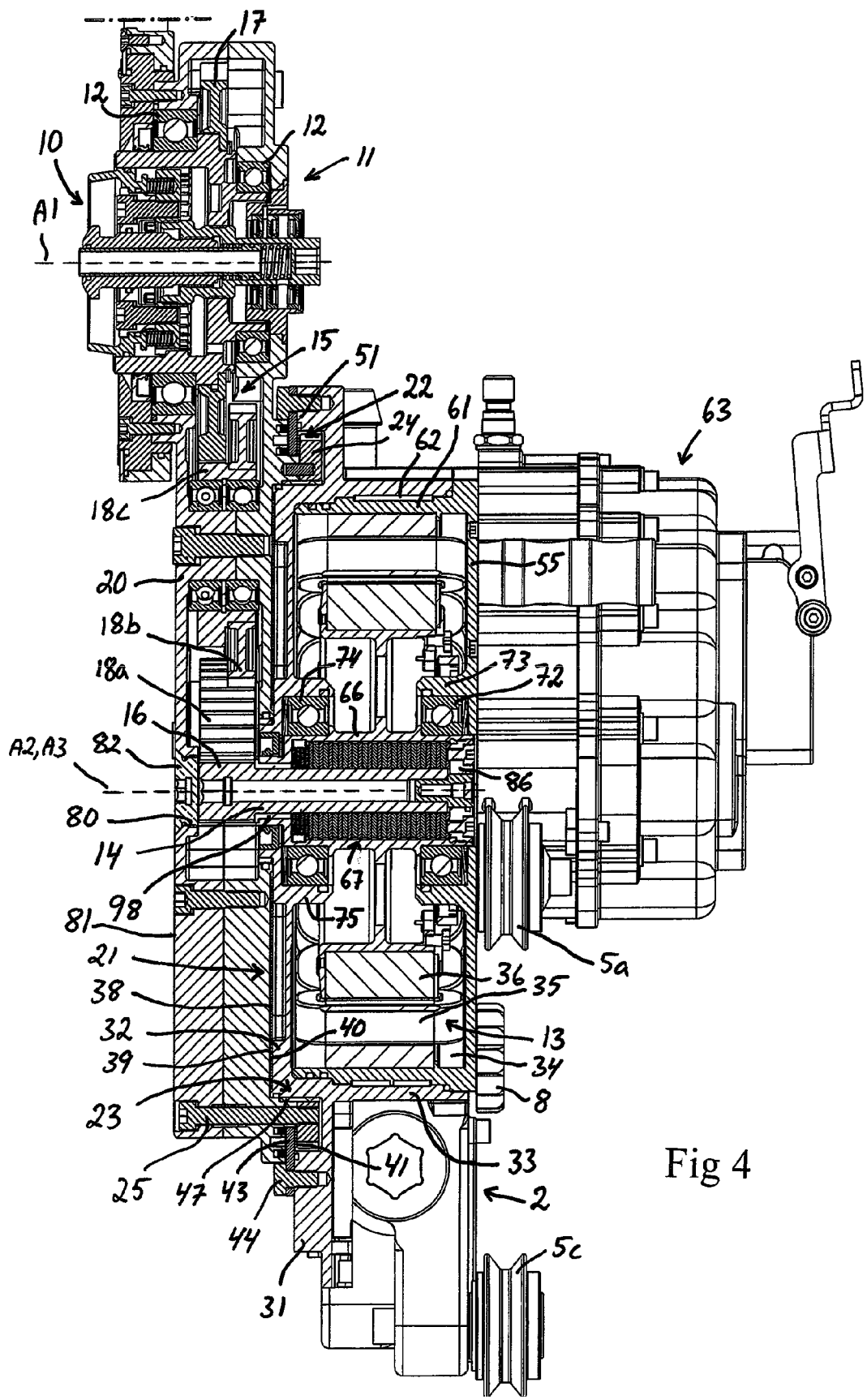
FIG. 4 is a partially sectioned lateral view of the carriage and saw arm included in the wall saw of FIG. 1.
Figure 6:
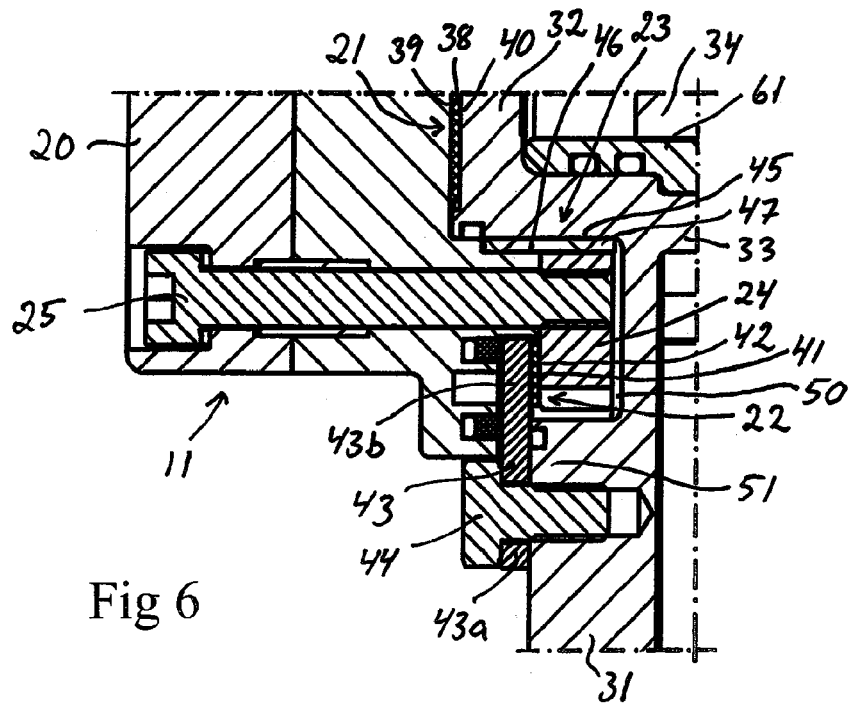
FIG. 6 shows another part from FIG. 4 in a larger scale.
Figure 11:
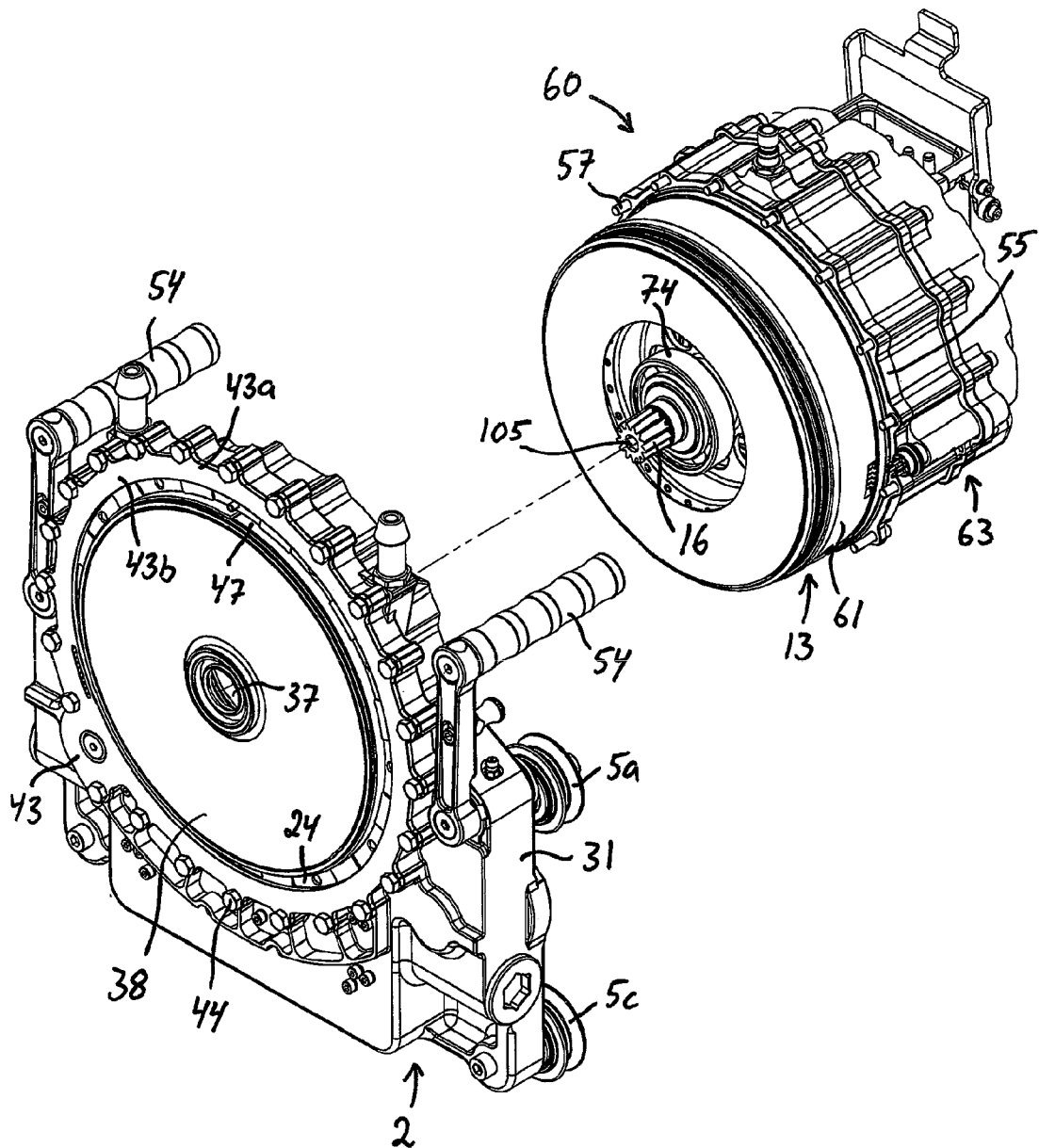
FIG. 11 is an exploded view of a motor module and the carriage included in the wall saw of FIG. 1.

In the illustrated embodiment, a first axial bearing 21 and a second axial bearing 22 are provided between the saw arm 11 and the carriage 2, as illustrated in FIGS. 4 and 6. The first axial bearing 21 comprises a flat and ring-shaped first sliding element 38, preferably in the form of a disc of plastic material, clamped between a contact surface 39 of the saw arm 11 and a corresponding contact surface 40 on the outer side of the wall 32. The second axial bearing 22 comprises a flat and ring-shaped second sliding element 41, preferably in the form of a ring of plastic material, clamped between a lateral surface 42 (see FIG. 6) on the ring gear 24 and a clamping member 43 fixed to the chassis 31. The clamping member 43 is of metallic material. The clamping member 43 is flat and ring-shaped and comprises an outer part 43a (see FIGS. 6 and 11), through which the clamping member is fixed to the chassis 31, and an axially springy part 43b which extends radially inwards from the outer part 43a and bears against the second sliding element 41 in a pre-tensioned manner. The axially springy part 43b of the clamping member is pre-tensioned against the second sliding element 41 so as to keep the second sliding element 41 clamped between the clamping member 43 and said lateral surface 42 on the ring gear under the effect of a spring force exerted by the clamping member. The outer part 43a of the clamping member is fixed to the chassis 31 by means of fastening members 44 in the form of screws. The above-mentioned contact surface 39 of the saw arm 11 is pressed towards the corresponding contact surface 40 on the outer side of the wall 32 under the effect of the clamping member 43. The saw arm 11 is retained in engagement with the chassis 31 under the effect of the spring force exerted by the clamping member 43. Thus, the clamping member 43 keeps the saw arm 11 secured to the carriage 2 in a pre-tensioned manner.

In the illustrated embodiment, a radial bearing 23 (see FIGS. 4 and 6) is provided between an outer circular cylindrical surface 45 of the chassis 31 and an inner circular cylindrical surface 46 of the saw arm 11. The radial bearing 23 comprises a sliding element 47, preferably in the form of a band of plastic material, arranged between said surfaces 45, 46.

In the illustrated embodiment, the ring gear 24 is received in an annular recess 50 (see FIGS. 6 and 10) in the chassis 31 and the outer part 43a of the clamping member 43 is fixed to a part 51 of the chassis which surrounds said recess 50. Furthermore, the guide rollers 5a-5d and the feed gear wheel 8 are rotatably mounted to the chassis 31, and the feed motor and the motor 28 of the actuating device 27 are received in a cavity 52 (see FIG. 9) provided in the chassis 31.

The carriage 2 may be lifted and carried by means of handles 54 mounted to the chassis 31.

A lid 55 is fixed to the flange 33 of the chassis at the outer free end thereof by means of fastening members 57 (see FIGS. 3 and 11) in the form of screws or bolts. The above-mentioned wall 32 of the chassis forms a first end wall of the motor cavity 34 and the lid 55 forms an opposite second end wall of the motor cavity 34. In the illustrated embodiment, the lid 55 and the drive motor 13 form part of a motor module 60 (see FIG. 11) which is detachably mounted to the chassis 31. The motor module 60 comprises a cylindrical sleeve 61 which is rigidly connected to the lid 55 and projects therefrom into the motor cavity 34, the stator 35 of the drive motor 13 being fixed to the sleeve 61 on the inner side thereof. An outer peripheral surface of the sleeve 61 abuts against an inner peripheral surface of the above-mentioned flange 33 of the chassis 31. A channel 62 for cooling fluid is provided in the interface between the outer peripheral surface of the sleeve 61 and the inner peripheral surface of the flange 33, as illustrated in FIG. 4. This cooling fluid channel 62 extends in the circumferential direction of the sleeve 61. In the illustrated example, the cooling fluid channel 62 is formed by a groove in the inner peripheral surface of the flange 33 and a corresponding groove in the outer peripheral surface of the sleeve 61.

The rotor 36 of the drive motor 13 comprises a rotor hub 66 (see FIGS. 4 and 5), which is rotatably mounted in the carriage 2 through at least one first bearing 72, for instance in the form of a ball bearing or a roller bearing, provided on the outer side of the rotor hub 66 at a first end thereof and at least one second bearing 74, for instance in the form of a ball bearing or a roller bearing, provided on the outer side of the rotor hub 66 at an opposite second end thereof. In the illustrated example, said at least one first bearing 72 is provided between a flange 73 on the inner side of the lid 55 and an outer peripheral surface at the first end of the rotor hub 66, and said at least one second bearing 74 is provide between a flange 75 on the inner side of the wall 32 of the chassis 31 and an outer peripheral surface at the second end of the rotor hub 66.

In the illustrated embodiment, the stator 35 of the drive motor 13 is located on the outside of the rotor 36. As an alternative, the stator 35 of the drive motor 13 may be located between an outer part of the rotor 36 and the rotor hub 66. In the latter case, the stator 35 is fixed to the lid 55 of the motor module 60.

The rotor hub 66 is operatively connected to the output shaft 14 of the drive motor through a safety clutch 67 so as to allow torque to be transmitted from the rotor hub 66 to the output shaft 14 via the safety clutch 67. The safety clutch 67 is configured to allow mutual rotation between the rotor hub 66 and the output shaft 14 when said torque reaches a given threshold value. The safety clutch 67 is accommodated in a space inside the rotor hub 66 and comprises one or more first clutch members 68 (see FIGS. 5, 12 and 13), each of which being non-rotatably fixed to the rotor hub 66, and one or more second clutch members 69 each of which being non-rotatably fixed to the output shaft 14. Said first and second clutch members 68, 69 are pressed towards each other under the effect of a spring member 70 so as to allow torque to be transmitted from the rotor hub 66 to the output shaft 14 via these clutch members 68, 69. The spring member 70 is also accommodated in the space inside the rotor hub 66. Said first and second clutch members 68, 69 and the spring member 70 are located between an inner peripheral surface of the rotor hub 66 and an outer peripheral surface of a part 14a of the output shaft 14 surrounded by the rotor hub 66. The above-mention threshold value is given by the spring force of the spring member 70.

The output shaft 14 is with advantage provided with a torque tool fitting 105 (see FIG. 5) designed for detachable engagement with a torque tool to be used for rotating the output shaft 14 in order to check the above-mentioned threshold value of the safety clutch 67. When the threshold value is to be checked by means of said torque tool, the rotor 36 of the drive motor 13 is temporarily prevented from rotating by means of a suitable stop member (not shown) that is brought into engagement with the rotor. The torque tool fitting 105 of the output shaft 14 is accessible through an opening 80 provided in an external wall 81 of the saw arm housing 20. The opening 80 is closed by a cover 82, which is removable from the opening 80. In the illustrated embodiment, the cover 82 constitutes an axial stop member for the output shaft 14, wherein an end of the output shaft 14 abuts against an inner surface of the cover 82. In the illustrated embodiment, the cover 82 is detachably mounted to the above-mentioned wall 81 of the saw arm housing 20 and provided with an external thread 83 that is in engagement with a corresponding internal thread 84 in the opening 80 in the wall 81. Thus, the cover 82 may be detached from and mounted to said wall 81 by screwing. The torque tool fitting 105 is accessible from the end of the output shaft 14 that faces said opening 80. In the illustrated embodiment, the torque tool fitting 105 has the form of an Allen key fitting provided in an axial hole 103 in the output shaft 14.

In the illustrated embodiment, said first and second clutch members 68, 69 have the form of ring-shaped discs and are arranged side by side in frictional engagement with each other. The output shaft 14 extends through a central opening in each clutch member 68, 69. The clutch members 68, 69 are moveable in the axial direction of the output shaft 14 and the rotor hub 66. In the illustrated example, each first clutch member 68 is provided with teeth 76 on its outer periphery, which teeth 76 are in engagement with internal splines in the rotor hub 66 so as to force the clutch member 68 to rotate together with the rotor hub 66, while at the same time allowing the clutch member 68 to slide axially in relation to the rotor hub 66. Each second clutch member 69 is provided with teeth 77 on its inner periphery, which teeth 77 are in engagement with external splines 78 on the output shaft 14 so as to force the clutch member 69 to rotate together with the output shaft 14, while at the same time allowing the clutch member 69 to slide axially on the output shaft 14. The first and second clutch members 68, 69 are arranged alternately side by side and are pressed towards each other by the spring member 70 so as to allow torque to be transmitted from the rotor hub 66 to the output shaft 14 by the frictional engagement between the clutch members.

In the illustrated embodiment, the spring member 70 is clamped between an internal shoulder 79 (see FIG. 5) on the rotor hub 66 and an axially outermost one of said clutch members 68, 69. The spring member 70 preferably comprises one or more Belleville washers 71, the output shaft 14 extending trough a central opening in each Belleville washer. In the illustrated example, the spring member 70 comprises four Belleville washers 71 arranged side by side.

Figure 5:
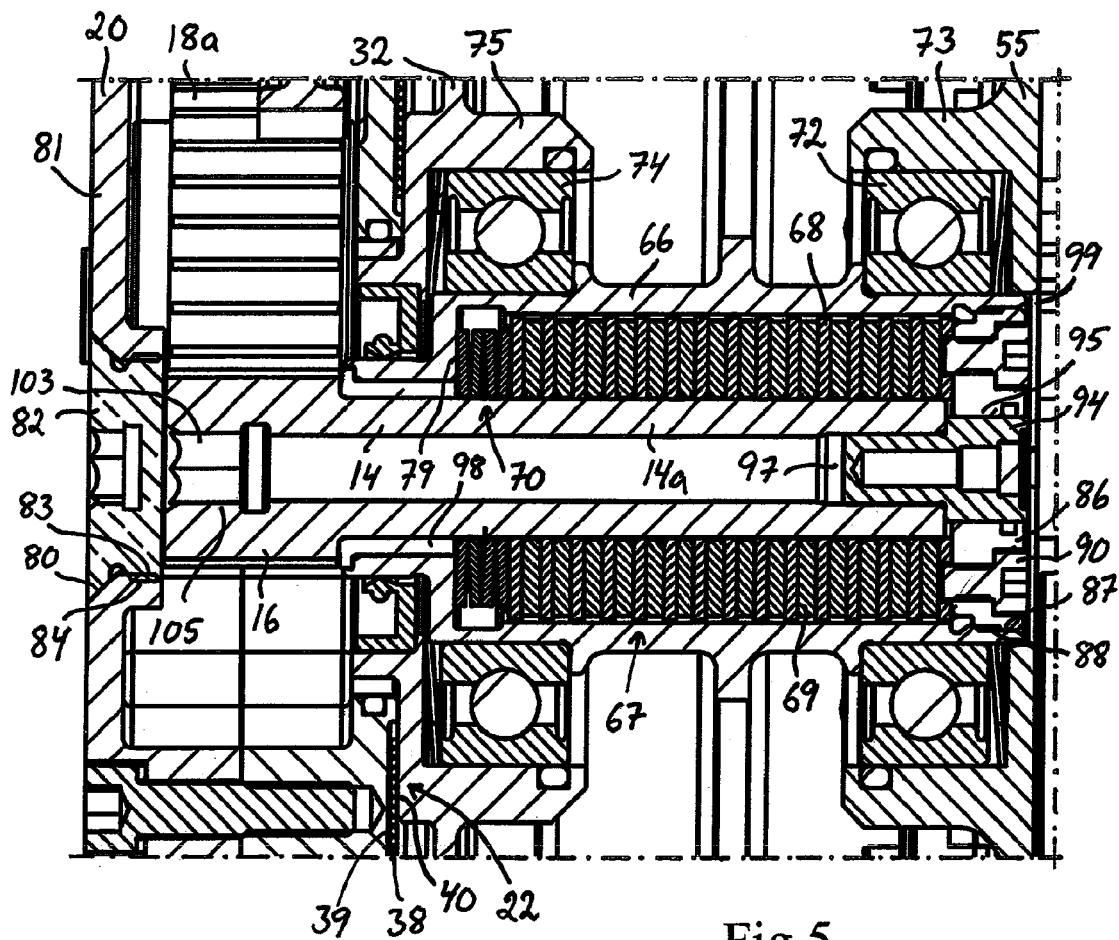
FIG. 5 shows a part from FIG. 4 in a larger scale.
Figure 12:
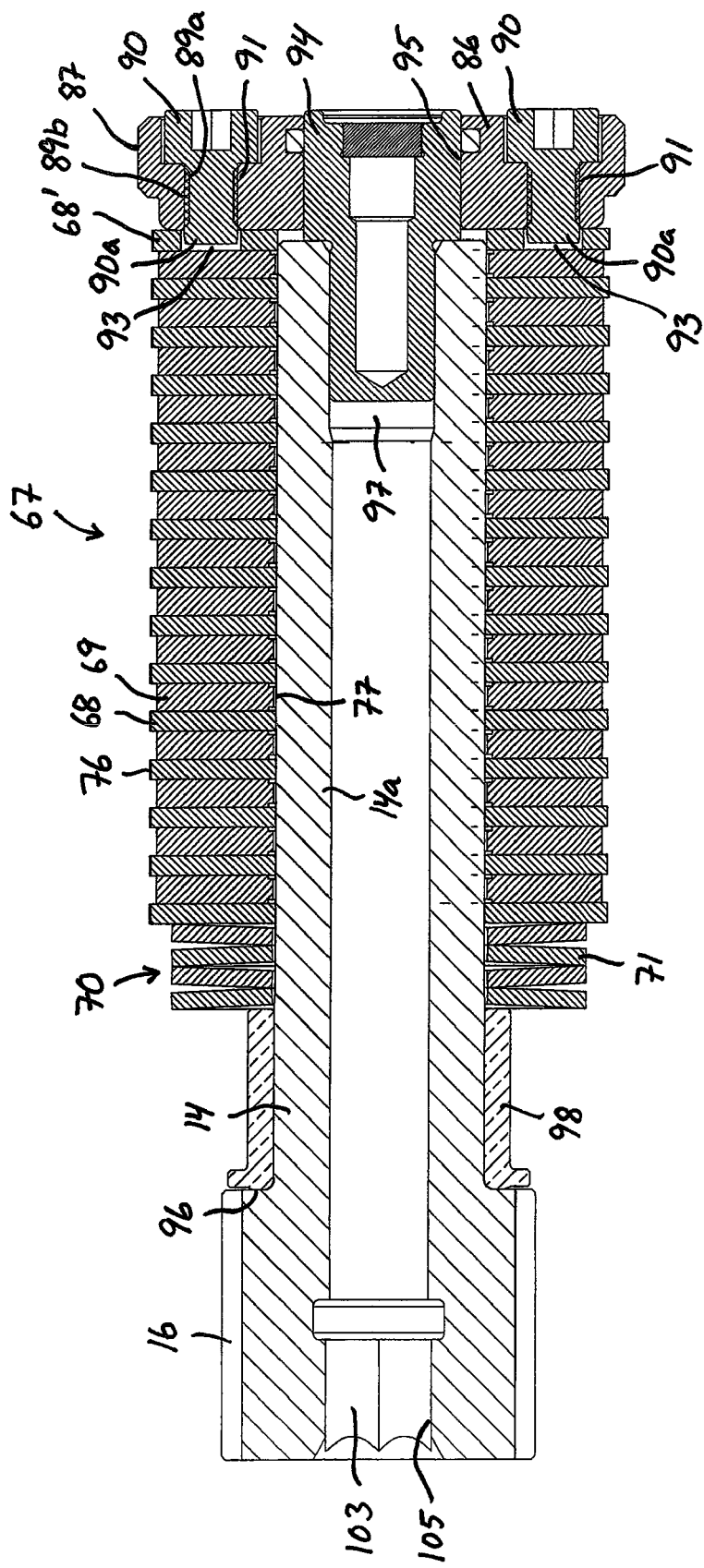
FIG. 12 is a longitudinal section through a safety clutch included in the wall saw of FIG. 1.
Figure 13:
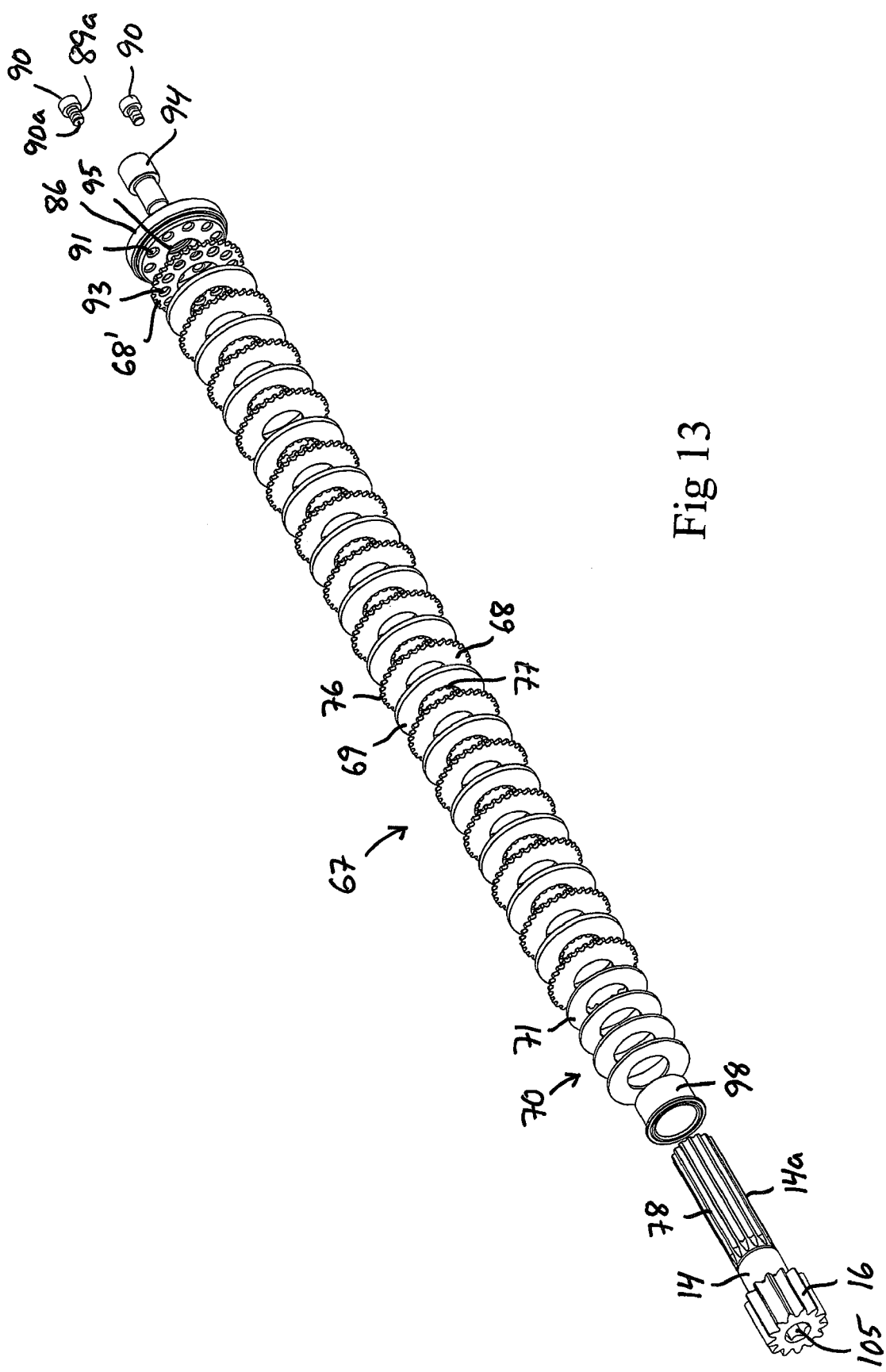
FIG. 13 is an exploded view of the safety clutch of FIG. 12.

The spring force of the spring member 70 is adjustable by means of an adjustment member 86, which is provided with an external thread 87 that is in engagement with a corresponding internal thread 88 in the rotor hub 66 at the above-mentioned first end of the rotor hub, as illustrated in FIG. 5. The adjustment member 86 abuts against an axially outermost one 68' of the first clutch members (see FIG. 12). The position of the adjustment member 86 in the axial direction of the rotor hub 66, and thereby the axial pre-tensioning and spring force of the spring member 70, is adjustable by screwing the adjustment member 86 in either direction in relation to the rotor hub 66. At least one locking screw 90 is received in an axial through hole 91 in the adjustment member 86. An inner end 90a of this locking screw 90 is engageable in a recess 93 in the last-mentioned clutch member 68' in order to lock the adjustment member 86 to this clutch member 68' and thereby prevent mutual rotation between the adjustment member 86 and the rotor hub 66. Thus, when the end 90a of the locking screw 90 is received in a recess 93 in the clutch member 68', the adjustment member 86 will be locked in its prevailing position in relation to the rotor hub 66. The locking screw 90 is provided with an external thread 89a that is in engagement with a corresponding internal thread 89b in said through hole 91, as illustrated in FIG. 12. In the illustrated example, two such locking screws 90 are used. To make possible an accurate adjustment of the position of the adjustment member 86, the clutch member 68' is provided with several recesses 93 distributed around the centre axis of the clutch member and/or the adjustment member 86 is provided with several threaded through holes 91 distributed around the centre axis of the adjustment member.

The above-mentioned space inside the rotor hub 66 is limited in a first axial direction by the above-mentioned shoulder 79 on the rotor hub 66 and in the opposite axial direction by the adjustment member 86.

At the above-mentioned first end of the rotor hub 66, the output shaft 14 of the drive motor 13 is rotatably mounted to the rotor hub 66 through the adjustment member 86. In the illustrated example, a stub shaft 94 fixed to the output shaft 14 is rotatably received in an axial recess 95 in the centre of the adjustment member 86. The stub shaft 94 is mounted in a recess 97 at the end of the output shaft 14, for instance by press fit. In the illustrated example, the adjustment member 86 is ring-shaped and the above-mentioned recess 95 is formed as an axial through hole in the adjustment member 86.

At the above-mentioned second end of the rotor hub 66, the output shaft 14 of the drive motor 13 is rotatably mounted to the rotor hub 66 through a sleeve-shaped sliding element 98 provided between the rotor hub 66 and the output shaft 14. This sliding element 98 is clamped between a shoulder 96 on the output shaft 14 and a Belleville washer 71 of the spring member 70, as illustrated in FIG. 12.

As an alternative to a disc type safety clutch 67 of the type described above, the safety clutch 67 may be a ball type safety clutch. In this case, the safety clutch comprises a number of balls which are moveable by a cam and against the action of a spring member from a first position, in which the balls are capable of transmitting torque from a first clutch member non-rotatably fixed to the rotor hub 66 to a second clutch member non-rotatably fixed to the output shaft 14, to a second position, in which the balls are incapable of transmitting torque from said first clutch member to said second member.

The wall saw 1 also comprises an electronic unit 63, which comprises electronic components for controlling the power supply to the stator 35 of the drive motor 13. In the illustrated embodiment, the electronic unit 63 is fixed to the lid 55 on the side thereof facing away from the motor cavity 34. The adjustment member 86 is accessible through an opening 99 (see FIG. 5) in the lid 55 when the electronic unit 63 has been detached from the lid.

The drive motor 13 is preferably a switched reluctance motor, but may alternatively be a permanent magnet motor or any other suitable electric motor.

The invention is of course not in any way restricted to the embodiments described above. On the contrary, many possibilities to modifications thereof will be apparent to a person with ordinary skill in the art without departing from the basic idea of the invention such as defined in the appended claims.

The invention claimed is:

1. A wall saw comprising:
   a carriage to be mounted to a guide rail so as to be moveable along the guide rail;
   a saw arm pivotally mounted to the carriage;
   a rotatable spindle configured for connection to a saw blade, the spindle being rotatably mounted to the saw arm;
   an electric drive motor, which is mounted to the carriage and which is provided with a stator, a rotor and an output shaft; and
   a transmission mechanism for transmitting torque from the output shaft of the drive motor to the spindle, the spindle being rotatable under the effect of the drive motor via the output shaft and the transmission mechanism,
   wherein the rotor of the drive motor comprises a rotor hub which is operatively connected to the output shaft of the drive motor through a safety clutch so as to allow torque to be transmitted from the rotor hub to the output shaft via the safety clutch, the safety clutch being configured to allow mutual rotation between the rotor hub and the output shaft when the torque reaches a given threshold value; and wherein the safety clutch is accommodated in a space inside the rotor hub.

2. A wall saw according to claim 1, wherein the safety clutch comprises one or more first clutch members, each of which being non-rotatably fixed to the rotor hub, and one or more second clutch members, each of which being non-rotatably fixed to the output shaft, wherein the first and second clutch members are pressed towards each other under the effect of a spring member so as to allow torque to be transmitted from the rotor hub to the output shaft via these clutch members.

3. A wall saw according to claim 2, wherein the first and second clutch members are located between an inner peripheral surface of the rotor hub and an outer peripheral surface of a part of the output shaft surrounded by the rotor hub.

4. A wall saw according to claim 3, wherein the first and second clutch members have the form of ring-shaped discs and are arranged side by side in frictional engagement with each other.

5. A wall saw according to claim 3,
wherein each one of the first clutch members is provided with teeth on its outer periphery, these teeth being in engagement with internal splines in the rotor hub; and
wherein each one of the second clutch members is provided with teeth on its inner periphery, these teeth being in engagement with external splines on the output shaft.

6. A wall saw according to claim 2, wherein the spring member is accommodated in the space inside the rotor hub.

7. A wall saw according to claim 6, wherein the spring member is clamped between a shoulder on the rotor hub and one of the first and second clutch members.

8. A wall saw according to claim 2, wherein the spring member comprises one or more Belleville washer, the output shaft extending through a central opening in each Belleville washer.

9. A wall saw according to claim 2, wherein the spring force of the spring member is adjustable by means of an adjustment member, which is provided with an external thread that is in engagement with a corresponding internal thread in the rotor hub.

10. A wall saw according to claim 9,
wherein the adjustment member abuts against one of the first clutch members; and
wherein at least one locking screw is received in an axial through hole in the adjustment member, an inner end of this locking screw being engageable in a recess in the last-mentioned clutch member in order to lock the adjustment member to this clutch member and thereby prevent mutual rotation between the adjustment member and the rotor hub.

11. A wall saw according to claim 9, wherein the output shaft is rotatably mounted to the rotor hub through the adjustment member.

12. A wall saw according to claim 1, wherein the output shaft is provided with a torque tool fitting designed for detachable engagement with a torque tool to be used for rotating the output shaft in order to check the threshold value of the safety clutch.

13. A wall saw according to claim 12, wherein the torque tool fitting is accessible through an opening provided in an external wall of a housing of the saw arm.

14. A wall saw according to claim 1, wherein the rotor hub is rotatably mounted in the carriage through at least one bearing provided on the outer side of the rotor hub at a first end thereof and at least one bearing provided on the outer side of the rotor hub at an opposite second end thereof.

15. A wall saw according to claim 14, wherein the drive motor is a switched reluctance motor or a permanent magnet motor.

* * * * *